="United States Patent" [19]

Akioka et al.

[11] Patent Number: 6,130,961
[45] Date of Patent: Oct. 10, 2000

[54] COLOR IMAGE DATA SYSTEM FOR SIMULATING BACKGROUND COLOR CHANGES

[75] Inventors: Fujio Akioka; Yasuhito Shiraishi, both of Kyoto, Japan

[73] Assignee: Dainippon Screen Mfg. Co., Ltd., Japan

[21] Appl. No.: 09/048,647

[22] Filed: Mar. 26, 1998

[30] Foreign Application Priority Data

Apr. 4, 1997 [JP] Japan .................................... 9-086936

[51] Int. Cl.$^7$ ...................................................... G06K 9/00
[52] U.S. Cl. ............................................................. 382/167
[58] Field of Search ..................................... 382/165, 163, 382/167; 358/515–520, 1.9; 348/584, 586, 587

[56] References Cited

FOREIGN PATENT DOCUMENTS 4-261856  9/1992  Japan .
8-204977  8/1996  Japan .

Primary Examiner—Joseph Mancuso
Assistant Examiner—F. E. Cooperrider
Attorney, Agent, or Firm—Ostrolenk, Faber, Gerb & Soffen, LLP

[57] ABSTRACT

A color image outputting apparatus adapted to generate display image data for simulatively displaying on an image displaying apparatus a color image to be formed on a recording sheet by means of an image recording apparatus. The apparatus includes: a conversion table for converting color image data into first color image data which exclude any influences of a ground color of the recording sheet; and a ground color correction circuit for correcting the first color image data outputted from the conversion table into second color image data in consideration of the ground color of the recording sheet to be used in the image recording apparatus. A data correction process to be performed by the ground color correction circuit is determined so that a measurement result on the ground color of the recording sheet is equated with a measurement result on a background color of the image displayed on the image displaying apparatus which corresponds to the ground color of the recording sheet.

15 Claims, 7 Drawing Sheets

COLOR IMAGE DATA SYSTEM FOR SIMULATING BACKGROUND COLOR CHANGES

BACKGROUND OF THE INVENTION

1. Field of the Invention

The present invention relates to a color image data outputting apparatus which converts C (cyan), M (magenta), Y (yellow) and K (black) data of an image to be recorded on a sheet by an image recording apparatus into R (red), G (green) and B (blue) data and applies the RGB data to an image displaying apparatus.

2. Description of Related Art

Conventionally, systems have been available which are adapted to subject image data inputted from an image data inputting apparatus such as a scanner to various image processing operations performed by a computer and then apply the processed image data to an image recording apparatus such as a printer so as to record a desired image on a paper sheet or the like. In recent years, some of the systems have been modified so that a print-out result, which is expected to be obtained when the image is outputted on a sheet by the printer, can be checked on a display screen such as of a monitor without actually outputting the image on the sheet by the printer.

In general, printers are adapted to form an image on a sheet on the basis of subtractive-process three primary color data, i.e., C (cyan), M (magenta) and Y (yellow) data, and K (black) data, while monitors are adapted to display an image on their display screens on the basis of additive-process three primary color data, i.e., R (red), G (green) and B (blue) data. Therefore, the aforesaid system adapted to check the print-out result of the image has to convert the CMYK data of the image to be inputted to the printer into the RGB data before applying the image data to the monitor.

Where CMYK data to be outputted to a printer are converted into RGB data on a complementary color basis and then the RGB data are applied to a monitor, however, the image outputted on the monitor has a great deviation in color tone from the image outputted on a sheet because the ground color (whiteness) of the sheet is different from the whiteness of the background of the monitor display screen.

One approach to this problem is that CMYK data are converted into RGB data on the basis of correspondences between CMYK data and RGB data preliminarily determined on the basis of an absolute standard utilizing tristimulus values X, Y, Z on the XYZ color specification and then the RGB data are inputted to a monitor to display on the monitor display screen an image having the same color tone as the image to be outputted on a sheet.

More specifically, when the CMYK data are converted into the RGB data, the aforesaid prior art employs two conversion tables, i.e., a printer conversion table for converting CMYK data into data represented by tristimulus XYZ values and a monitor conversion table for converting XYZ data into RGB data.

The printer conversion table and the monitor conversion table are prepared by measuring colors of a plurality of color patches printed on a sheet by the printer and colors of a plurality of color patches displayed on the monitor display screen by means of a calorimeter. More specifically, CMYK data for predetermined plural colors (e.g., 500 to 1,000 colors) are applied to the printer, and color patches of the predetermined plural colors are printed on a predetermined sheet. Then, the colors of the color patches are each measured by the calorimeter, and correspondences between the resulting color measurement values (X, Y, Z) and the CMYK data are determined and stored in a memory. Thus, the printer conversion table for converting CMYK data into XYZ data can be obtained.

In turn, color patches respectively having colors close to the colors of the plural color patches printed on the sheet are displayed on the monitor by applying a plurality of RGB data. Then, the color of one of the color patches displayed on the monitor is measured by means of the colorimeter to obtain color measurement values $(X_1, Y_1, Z_1)$. At this time, the color of a color patch on the sheet close to the color of the measured color patch on the monitor is measured to obtain reference color measurement values (X, Y, Z). The corresponding RGB data to be applied to the monitor are adjusted so that the color measurement values $(X_1, Y_1, Z_1)$ for the color patch on the monitor display screen are equated with the reference color measurement values (X, Y, Z), i.e., the color tone of the color patch on the sheet is equated with the color tone of the color patch on the monitor display screen. The reference values (X, Y, Z) are stored in the memory in correspondence with the RGB data thus adjusted to equate the color tones of the color patches on the sheet and on the monitor with each other. This operation is performed on each of the color patches displayed on the monitor for preparation of the monitor conversion table for converting XYZ data into RGB data.

When the print-out result, which is expected to be obtained when an image is printed on a sheet by the printer, is to be displayed on the monitor display screen, the CMYK data of the image are converted into XYZ data with the use of the printer conversion table. Then, the XYZ data thus obtained are converted into RGB data with the use of the monitor conversion table. The RGB data thus obtained are inputted to the monitor. Thus, an image having the same color tone as the image to be printed on the sheet by the printer can be displayed on the monitor display screen.

Where a print-out result expected to be obtained when the image is recorded on a sheet different in paper quality (or ground color) from the sheet on which the color patches have been printed is displayed on the monitor by applying the RGB data generated on the basis of the printer conversion table and the monitor conversion table, however, the image displayed on the monitor display screen does not have the same color tone as the image to be outputted on the sheet. This is because the printer conversion table and the monitor conversion table are designed such that the correspondences between CMYK data and RGB data are determined so as to equate the color tone of an image to be printed on a sheet with the color tone of an image displayed on the monitor on the assumption that a sheet on which the image is to be printed would have the same ground color as the sheet on which the color patches have been printed.

Therefore, where the print-out result expected to be obtained when the image is printed on the sheet having a different ground color is displayed on the monitor, the prior art system requires preparation of an additional printer conversion table and a monitor conversion table. However, the preparation of these conversion tables involves the measurement of 500 to 1,000 colors as described above and, hence, requires tremendous time and labor.

SUMMARY OF THE INVENTION

It is therefore an object of the present invention to provide an image data outputting apparatus which is capable of displaying on an image displaying apparatus an image having the same color tone as an image to be outputted on a recording sheet without preparing additional conversion tables even if the type of the recording sheet is changed (even if a recording sheet having a different paper quality or ground color is used).

It is another object of the present invention to provide a method which ensures that an image having the same color tone as an image to be recorded on a recording sheet by an image recording apparatus can readily be displayed on an image displaying apparatus regardless of the type of the recording sheet.

It is a more specific object of the present invention to provide an image data outputting apparatus and method which, where a print-out result expected to be obtained when an image is recorded on a recording sheet different in paper quality (or ground color) from a recording sheet used for preparation of a printer conversion table and a monitor conversion table is to be displayed on an image displaying apparatus, does not require preparation of additional conversion tables, yet ensuring that an image indicative of the print-out result displayed on a monitor display screen of the image displaying apparatus has the same color tone as the image to be recorded on the recording sheet.

The color image data outputting apparatus according to the present invention includes: a conversion table for converting color image data to be applied to an image recording apparatus into first color image data which exclude any influences of a ground color of a recording sheet; a ground color correction circuit for correcting the first color image data into second color image data in consideration of the ground color of the recording sheet to be used in the image recording apparatus, and causing the displaying apparatus to display an image corresponding to the second color image data; a ground color measuring device for measuring the ground color of the recording sheet to be used in the image recording apparatus; a display background color. measuring device for measuring a color of a portion of the image simulatively displayed on the image displaying apparatus which corresponds to the ground color of the recording sheet; and a controller for determining a data correcting process to be performed by the ground color correction circuit so as to equate a color measurement result obtained by the ground color measuring device with a color measurement result obtained by the display background color measuring device.

With this arrangement, the color image data to be applied to the image recording apparatus are converted into the first color image data which exclude the influences of the ground color of the recording sheet with the use of the conversion table. The first color image data are corrected into the second color image data in consideration of the ground color of the recording sheet to be used in the image recording apparatus by the ground color correction circuit. The data correction process to be performed by the ground color correction circuit is determined by the controller so as to equate the color measurement result obtained by the ground color measuring device with the color measurement result obtained by the display background color measuring device.

Thus, the image displayed on the image displaying apparatus on the basis of the second color image data with its background color (the color of the image portion corresponding to the ground color of the recording sheet) equated with the ground color of the recording sheet has substantially the same color tone as the image to be recorded on the recording sheet by the image recording apparatus.

Further, where a print-out result expected to be obtained when the image is recorded on a second recording sheet having a different paper quality is displayed on the image displaying apparatus, the first color image data are subjected to the data correction process performed by the ground color correction circuit in accordance with the ground color of the second recording sheet to be used in the image recording apparatus, thereby obviating the need for changing the conversion table. Therefore, the burden on an operator is considerably alleviated in comparison with the prior art which requires tremendous time and labor for preparation of an additional printer conversion table and monitor conversion table.

In accordance with one embodiment of the present invention, the ground color correction circuit includes a data conversion table for converting the first color image data into the second color image data, which are in turn inputted to the image displaying apparatus.

In accordance with another embodiment of the present invention, the ground color correction circuit controls a display operation of the image displaying apparatus to display the image corresponding to the second color image data on the image displaying apparatus with the first color image data being inputted to the image displaying apparatus.

With this arrangement, the first color image data are inputted directly to the image displaying apparatus, and corrected into the second color image data in the image displaying apparatus.

Therefore, after a print-out result expected to be obtained when the image is recorded on one sheet is displayed on the image displaying apparatus, a print-out result expected to be obtained when the image is recorded on another sheet different in paper quality from the one sheet can be displayed on the image displaying apparatus simply by controlling the display operation of the image displaying apparatus with the first color image data being inputted to the image displaying apparatus. Thus, the time required for displaying the image on the image displaying apparatus after the type of the recording sheet is changed can be reduced.

In accordance with still another embodiment of the present invention, the controller includes a storage medium for storing therein correction process data indicative of the data correcting process employed when the color measurement result obtained by the ground color measuring device is equated with the color measurement result obtained by the display background color measuring device. In this case, the storage medium may be a memory device or a memory unit such as a hard disk unit.

With this arrangement, once the data correcting process to be performed by the ground color correction circuit is determined and the correction process data indicative of the data correcting process are stored in the storage medium, there is no need to change the data correcting process until the type of the recording sheet to be used in the image recording apparatus is changed.

In this case, the storage medium is preferably adapted to store therein a plurality of correction process data corresponding to plural types of recording sheets, and the controller is preferably adapted to select one of the plurality of correction process data and determine the data correcting process to be performed by sheet ground color correction circuit on the basis of the selected correction process data.

With this arrangement, when the type of the recording sheet to be used in the image recording apparatus is changed, the data correcting process can be determined simply by reading out correction process data corresponding to the type of the recording sheet from the storage medium. Therefore, the operation for equating the color measurement result obtained by the ground color measuring device with the color measurement result obtained by the display background color measuring device can be obviated, so that the processing speed can drastically be increased.

The foregoing and other objects, features and effects of the present invention will become more apparent from the following description of the preferred embodiments with reference to the attached drawings.

DESCRIPTION OF THE PREFERRED EMBODIMENTS

Figure 1:
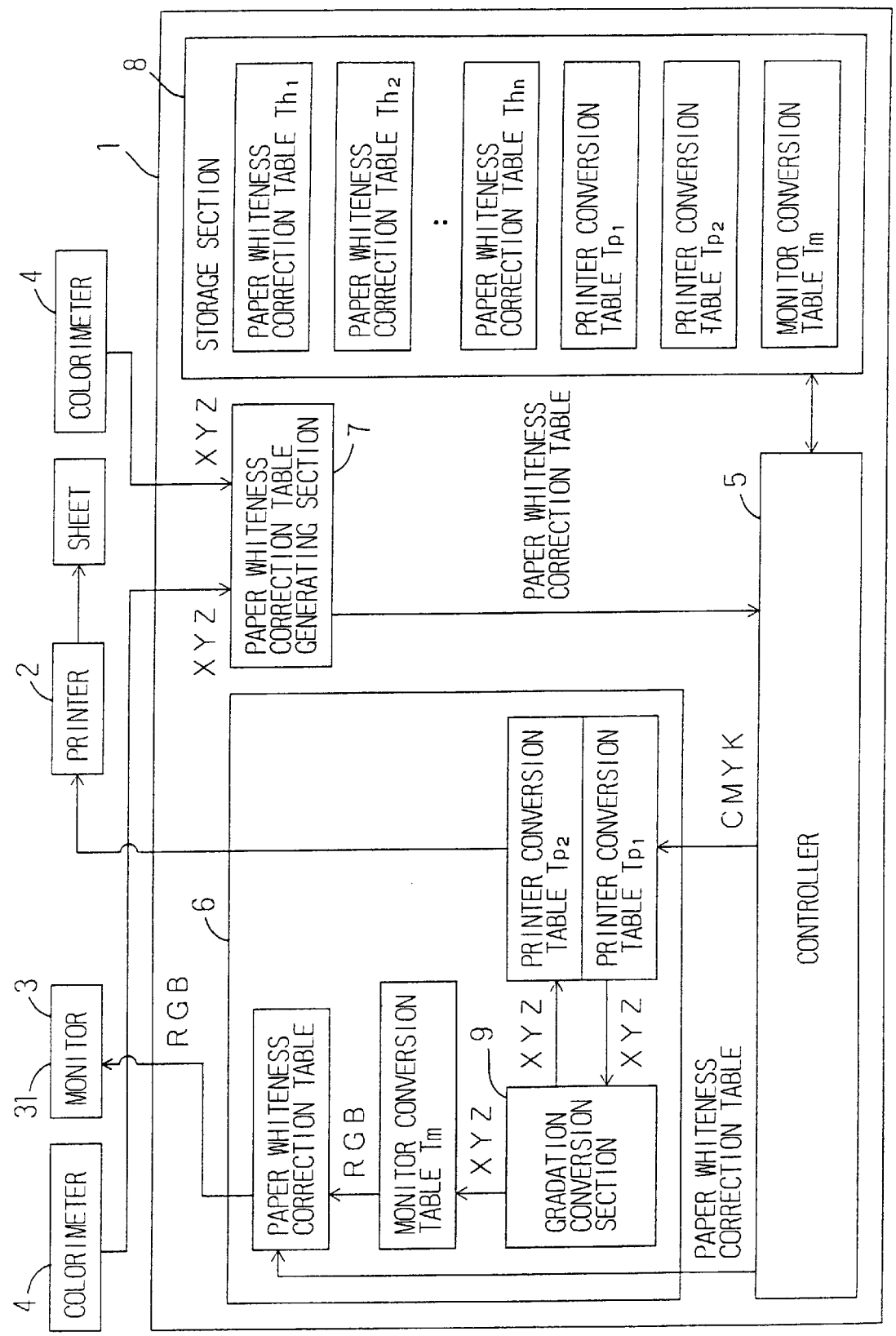
FIG. 1 is a block diagram illustrating the construction of a system to which a color image data outputting apparatus according to a first embodiment of the present invention is applied.

FIG. 1 is a block diagram illustrating the construction of a system to which a color image data outputting apparatus according to a first embodiment of the present invention is applied.

The system includes a color image data outputting apparatus 1 for processing image data inputted from an image inputting apparatus such as a scanner not shown and outputting the processed image data, a printer 2 for recording an image on a sheet on the basis of the image data processed in the color image data outputting apparatus 1, and a monitor 3 for displaying an image on the basis of the image data processed in the color image data outputting apparatus 1. The color image data outputting apparatus 1 is connected to a colorimeter 4 for measuring colors in the image outputted by the printer 2 and colors in the image outputted on a display screen 31 of the monitor 3. The calorimeter 4 digitizes each of the measured colors into tristimulus values X, Y, Z, and outputs the tristimulus XYZ data.

The color image data outputting apparatus 1 is embodied by a personal computer, for example. The color image data outputting apparatus 1 includes a controller 5 such as of a CPU, a monitor/printer outputting section 6 for generating image data to be applied to the printer 2 and the monitor 3 on the basis of the inputted image data, a paper whiteness correction table generating section 7 for generating a paper whiteness correction table which will be described later, and a storage section 8 for storing therein paper whiteness correction tables. The functions of the monitor/printer outputting section 6 and the paper white correction table generating section 7 are realized through processes to be performed on a software basis by the controller 5.

The image data inputted to the color image data outputting apparatus 1 from the image inputting apparatus not shown are subjected to a proper image processing operation and retained, for example, in the storage section 8 as subtrative-process three primary color data, i.e., C (cyan), M (magenta) and Y (yellow) data, and K (black) data. When an image is to be outputted on a sheet or on the display screen 31 of the monitor 3, the CMYK data stored in the storage section 8 are read out and applied to the monitor/printer outputting section 6 by the controller 5.

The CMYK data inputted to the monitor/printer outputting section 6 are first applied as an address to a printer conversion table $Tp_1$. The printer conversion table $Tp_1$ is prepared through a printer conversion table preparation process which will be described later, and is used to convert the CMYK data into XYZ data (represented by tristimulus XYZ values on the basis of the XYZ color specification) which do not include color data indicative of the ground color of the sheet on which the image is to be recorded.

Thus, the CMYK data inputted to the monitor/printer outputting section 6 are converted into the XYZ data by addressing the printer conversion table $Tp_1$.

The XYZ data read out of the printer conversion table $Tp_1$ are inputted to a gradation conversion section 9. The gradation conversion section 9 corrects the inputted image data so that the gradation range of the inputted image data can be accommodated in the entire output gradation range of the printer 2. Thus, the image to be recorded on the sheet by the printer will have an excellent gradational expression.

When the image is to be outputted on the sheet, the XYZ data corrected by the gradation conversion section 9 are applied as an address to another printer conversion table $Tp_2$. The printer conversion table $TP_2$ is used to convert the XYZ data into CMYK data, and contains therein data similar to the aforesaid printer conversion table $Tp_1$. Therefore, the XYZ data are converted back into CMYK data by addressing the printer conversion table $Tp_2$. When the CMYK data from the printer conversion table $TP_2$ are applied to the printer 2, the image is recorded on the sheet by the printer 2 on the basis of the CMYK data.

On the other hand, when the image is to be outputted on the display screen 31 of the monitor 3, the XYZ image data processed by the gradation conversion section 9 are applied as an address to a monitor conversion table Tm. The monitor conversion table Tm is prepared through a monitor conversion table preparation process which will be described later, and is used to convert the XYZ data into additive-process three primary color data, i.e., R (red), G (green) and B (blue) data. Therefore, when the XYZ data are applied as an address to the monitor conversion table Tm, RGB data are read out of the monitor conversion table Tm.

The RGB data thus read out are applied as an address to the paper whiteness correction table generated by the paper whiteness correction table generating section 7 or one of paper whiteness correction tables $Th_1$ to $Th_n$ stored in the storage section 8. The paper whiteness correction tables are each adapted to add color data indicative of the ground color of a sheet on which the image is to be recorded by the printer 2 to the RGB data outputted from the monitor conversion table Tm, and output the resulting data. Therefore, when the RGB data read out of selected one of the paper whiteness correction tables are inputted to the monitor 3, an image having the same color tone as the image to be outputted on the sheet by the printer 2 is displayed on the display screen 31 of the monitor 3.

Figure 2:
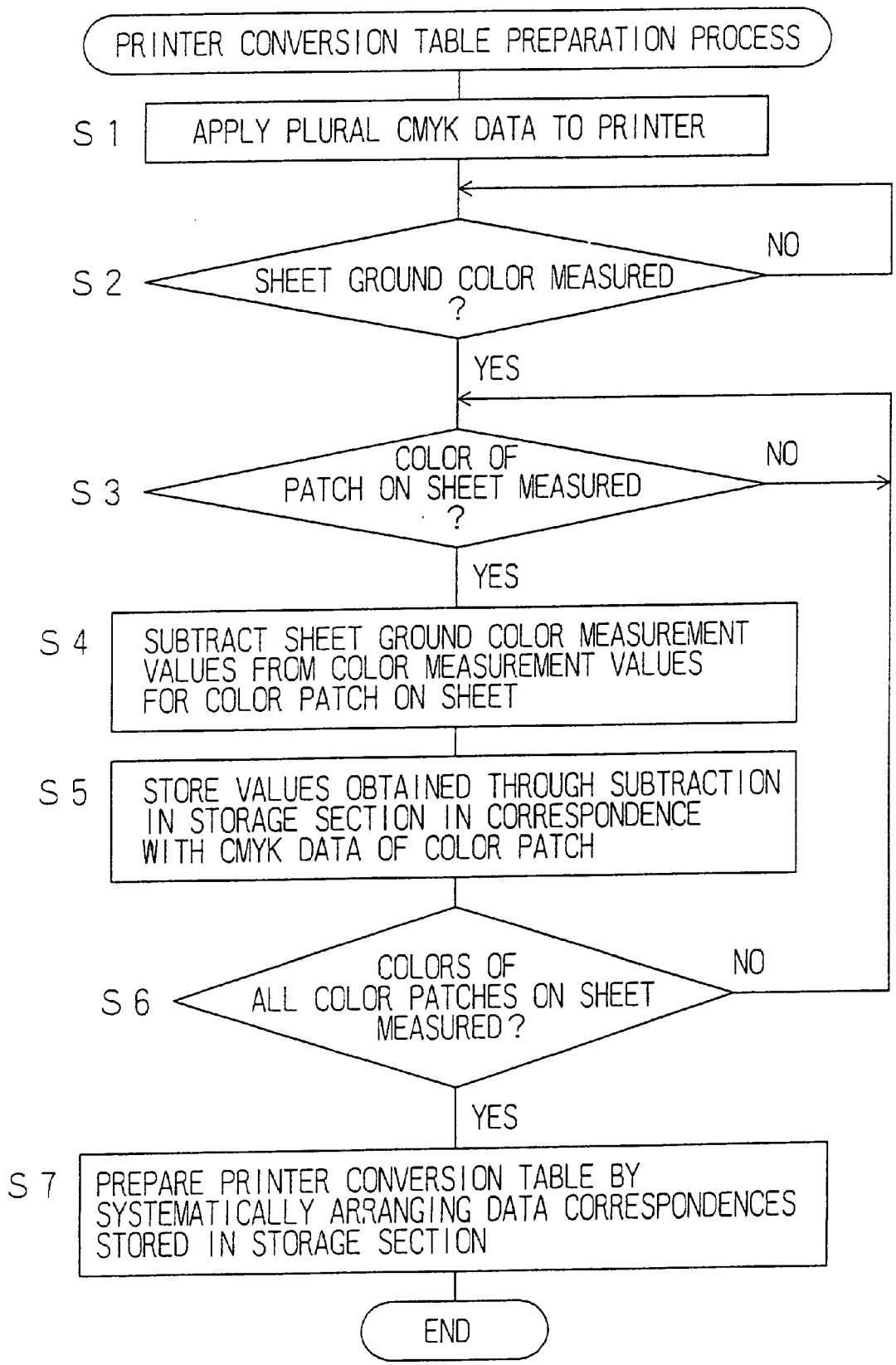
FIG. 2 is a flow chart illustrating a process for generating a printer conversion table.

FIG. 2 is a flow chart illustrating the printer conversion table preparation process.

When the system shown in FIG. 1 is set up, an operator operates a keyboard (not shown) connected to the color image data outputting apparatus 1 to input a demand signal to the color image data outputting apparatus 1 for initiating the printer conversion table preparation process. In response to the signal, the printer conversion table preparation process is started.

Figure 7:
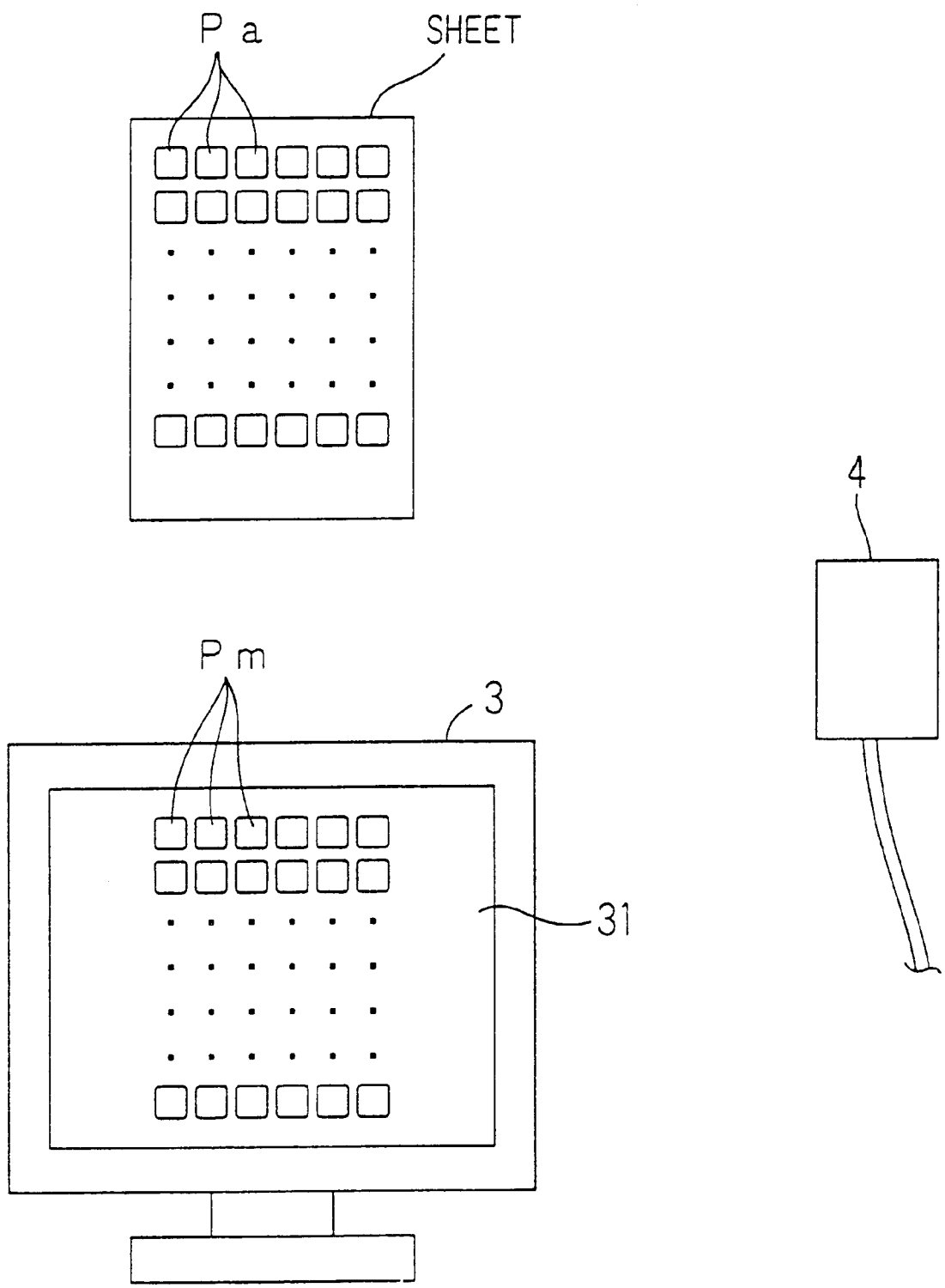
FIG. 7 is a schematic diagram illustrating color patches printed on a recording sheet and color patches displayed on a monitor display screen.

Referring to FIGS. 1 and 2, the storage section 8 stores therein CMYK data for a plurality of patches of predetermined colors (e.g., 500 to 1,000 colors). When the printer conversion table preparation process is started, the controller 5 successively reads out the plural color patch CMYK data stored in the storage section 8, and inputs the CMYK data to the printer 2 (Step S1). Thus, the plurality of color patches Pa are printed on a sheet on the basis of the plural color patch CMYK data as shown in FIG. 7.

When the plurality of color patches Pa are outputted on the sheet, the operator measures the ground color of the sheet by the colorimeter 4 connected to the color image data outputting apparatus 1. When color measurement values $(X_0, Y_0, Z_0)$ obtained through the sheet ground color measurement performed by the operator are inputted to the color image data outputting apparatus 1 from the calorimeter 4, the result of the judgment of whether or not the sheet ground color has been measured is positive (YES in Step S2).

In turn, the controller 5 judges whether or not one of the color patches outputted on the sheet has been subjected to the color measurement (Step S3). When the color measurement values $(X_1, Y_1, Z_1)$ obtained through the color measurement performed on the one color patch Pa by the operator are inputted to the color image data outputting apparatus 1, the result of the Judgment in Step S3 is positive, and the process goes to Step S4. In Step S4, the color measurement values $(X_0, Y_0, Z_0)$ obtained through the sheet ground color measurement are subtracted from the color measurement values $(X_1, Y_1, Z_1)$ obtained through the color measurement performed on the patch Pa on the sheet. The values $(X_1-X_0 Y_1-Y_0, Z_1-Z_0)$ obtained in Step S4 are stored in the storage section 8 in correspondence with the CMYK data of the color patch Pa subjected to the color measurement (Step S5).

Following Step S5, it is judged whether or not all the color patches Pa on the sheet have been subjected to the color measurement (Step S6). Since only one color patch Pa has been subjected to the color measurement at this time, the result of the judgment in Step S6 is negative, and the process returns to Step S3. After it is confirmed in Step S3 that a second color patch Pa has been subjected to the color measurement, the sheet ground color measurement values are subtracted from the color measurement values for the second color patch Pa. Then, the resulting values (XYZ data) are stored in the storage section 8 in correspondence with the CMYK data, and the judgment in Step S6 is performed again.

The process sequence from Step S3 to Step S6 is repeated to successively determine the correspondences between CMYK data and calculated XYZ data for the respective color patches Pa. When the correspondences between the CMYK data and the XYZ data for all the color patches Pa on the sheet have been determined, the result of the judgment in Step S6 is positive, and the process goes to Step S7.

In Step S7, the correspondences between the CMYK data and the XYZ data stored in the storage section 8 are systematically arranged to prepare the printer conversion table $Tp_1$, from which XYZ data are outputted by applying CMYK data as an address and the printer conversion table $TP_2$ from which CMYK data are outputted by applying XYZ data as an address.

Thus, the printer conversion tables $Tp_1$ and $TP_2$ are prepared by determining the correspondences between the CMYK data to be inputted to the printer 2 and the XYZ data obtained by subtracting the sheet ground color measurement values from the color measurement values for the respective color patches outputted on the sheet by the printer 2. Therefore, CMYK data applied as an address to the printer conversion table $Tp_1$ are converted into XYZ data which exclude the sheet ground color data (i.e., YXZ data obtained through preliminary subtraction of the sheet ground color data which are to be later added), and the resulting XYZ data are inputted to the gradation conversion section 9.

Figure 3:
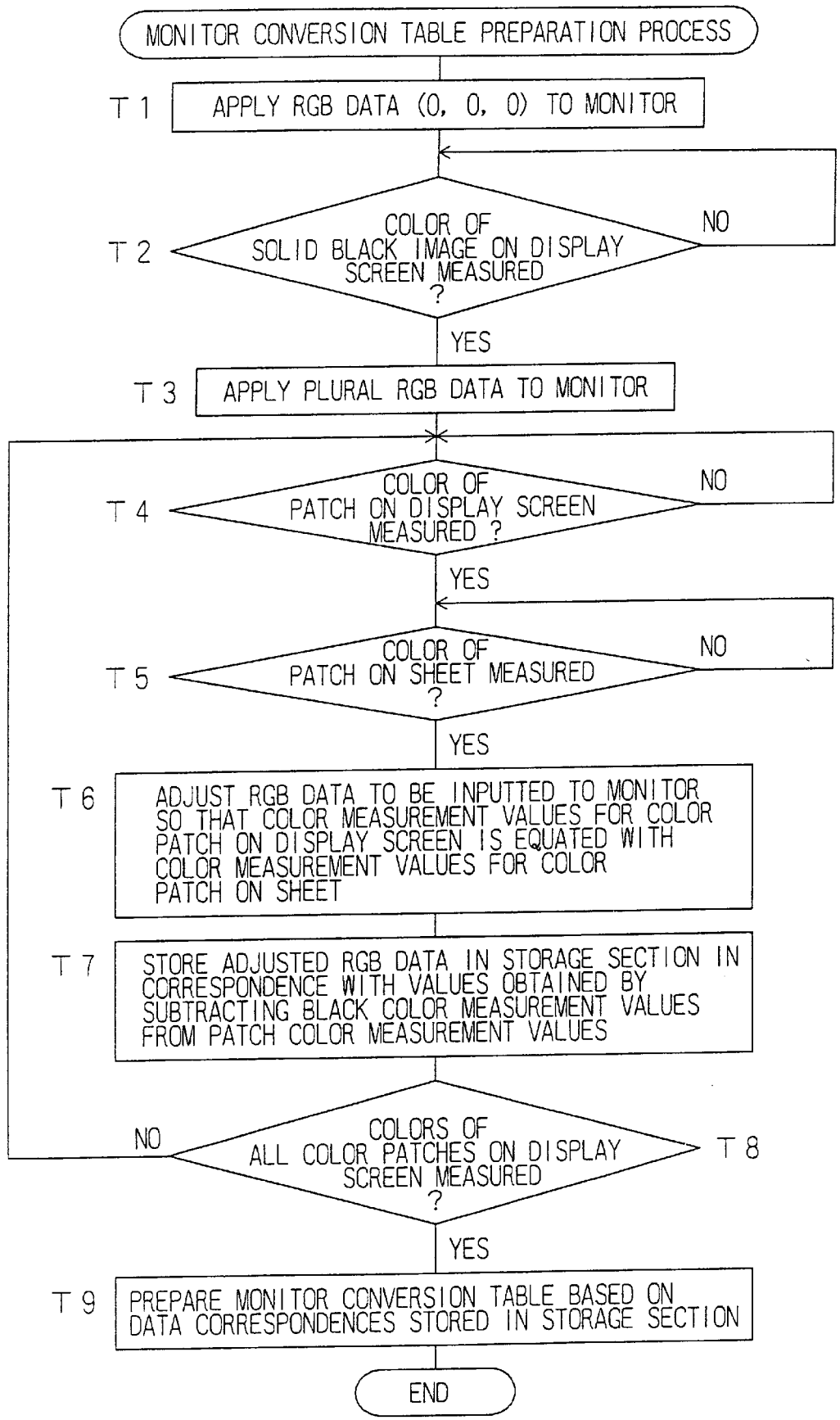
FIG. 3 is a flow chart illustrating a process for generating a monitor conversion table.

FIG. 3 is a flow chart illustrating the monitor conversion table preparation process.

After the aforesaid printer conversion table preparation process has been performed, the operator operates the keyboard (not shown) to input a demand signal to the color image data outputting apparatus 1 for initiating the monitor conversion table preparation process. In response to the signal, the monitor conversion table preparation process is started.

Referring to FIGS. 1 and 3, when the monitor conversion table preparation process is started, the controller 5 applies (R, G, B)=(0, 0, 0) to the monitor 3 (Step T1). Then, a solid black image is displayed on the display screen 31 of the monitor 3. The operator measures the color of the solid black image by means of the calorimeter 4. When color measurement values (Xk, Yk, Zk) obtained through the color measurement performed on the solid black image by the operator are inputted to the color image data outputting apparatus 1, the controller 5 determines that the solid black image has been subjected to the color measurement (Yes in Step T2).

On the other hand, RGB data (corresponding to the color patch CMYK data) for a plurality of patches of predetermined colors (500 to 1,000 colors) are stored in the storage section 8 connected to the controller 5. If the result of the judgment in Step T2 is positive, the plural color patch RGB data stored in the storage section 8 are read out and inputted to the monitor 3 by the controller 5 (Step S3). Thus, color patches Pm similar in color to the plural color patches Pa printed on the sheet in the printer conversion table preparation process are displayed on the display screen 31 of the monitor 3 as shown in FIG. 7.

In turn, the operator measures the color of one of the plural color patches Pm displayed on the display screen 31. When the color measurement values $(X_2, Y_2, Z_2)$ obtained through the color measurement are inputted to the color image data outputting apparatus 1, the result of the judgment of whether or not a color patch Pm on the display screen 31 has been subjected to the color measurement is positive (YES in Step T4), and the process goes to Step T5.

In Step T5, it is judged whether or not the color of a color patch Pa similar in color to the color patch Pm on the display screen 31 subjected to the color measurement by the operator has been measured. More specifically, the operator selects a color patch Pa corresponding to the color patch Pm subjected to the color measurement in Step S4 from the plurality of color patches Pa outputted on the sheet in the aforesaid printer conversion table preparation process, and measures the color of the selected color patch Pa by means of the colorimeter 4. When the color measurement on the selected color patch Pa is completed, the result of the judgment in Step T5 is positive, and the process goes to Step T6.

In Step T6, the RGB data to be inputted to the monitor 3 are adjusted by the controller 5 so that the color measurement values $(X_2, Y_2, Z_2)$ obtained through the color measurement on the color patch Pm on the display screen 31 can be equated with the color measurement values $(X_1, Y_1, Z_1)$ obtained through the color measurement on the color patch Pa. More specifically, the RGB data to be inputted to the monitor 3 are adjusted so that the color patch Pm displayed on the display screen 31 has the same color tone as the color patch Pa on the sheet. When the color patch Pm having the same color tone as the color patch Pa on the sheet is displayed on the display screen 31 of the monitor 3, the RGB data inputted to the monitor 3 at this time are stored in the storage section 8 in correspondence with values $(X_2-Xk, Y_2-Yk, Z_2-Zk)$ obtained by subtracting the monitor black color measurement values (Xk, Yk, Zk) from the color measurement values $(X_2, Y_2, Z_2)$ (Step T7).

Following Step T7, it is judged whether or not all the color patches Pm on the display screen 31 have been subjected to the color measurement (Step T8). Since only one color patch Pm on the display screen 31 has been subjected to the color measurement at this time, the result of the judgment in Step T8 is negative, and the process returns to Step T4. Then, the process sequence from Step T4 to Step T8 is repeated to successively determine correspondences between RGB data and XYZ data for the respective color patches Pm on the display screen 31. When the correspondences between the RGB data and the XYZ data for all the color patches Pm on the display screen 31 are determined, the result of the judgment in step T8 is positive, and the process goes to Step T9.

In Step T9, the correspondences between the RGB data and the XYZ data stored in the storage section 8 are systematically arranged to prepare the monitor conversion table Tm from which RGB data are outputted by applying XYZ data as an address.

Thus, the monitor conversion table Tm is prepared by matching the colors of the color patches Pm outputted on the display screen 31 of the monitor 3 with the colors of the color patches Pa outputted on the sheet by the printer 2 and then determining the correspondences between the RGB data to be inputted to the monitor 3 and the XYZ data obtained by subtracting the color measurement values for the solid black image displayed on the display screen 31 from the color measurement values for the respective color patches Pm. Therefore, XYZ data (excluding the sheet ground color data) generated on the basis of the aforesaid printer conversion table $Tp_1$ are applied as an address to the monitor conversion table Tm so as to be converted into RGB data which do not include the sheet ground color data.

Figure 4:
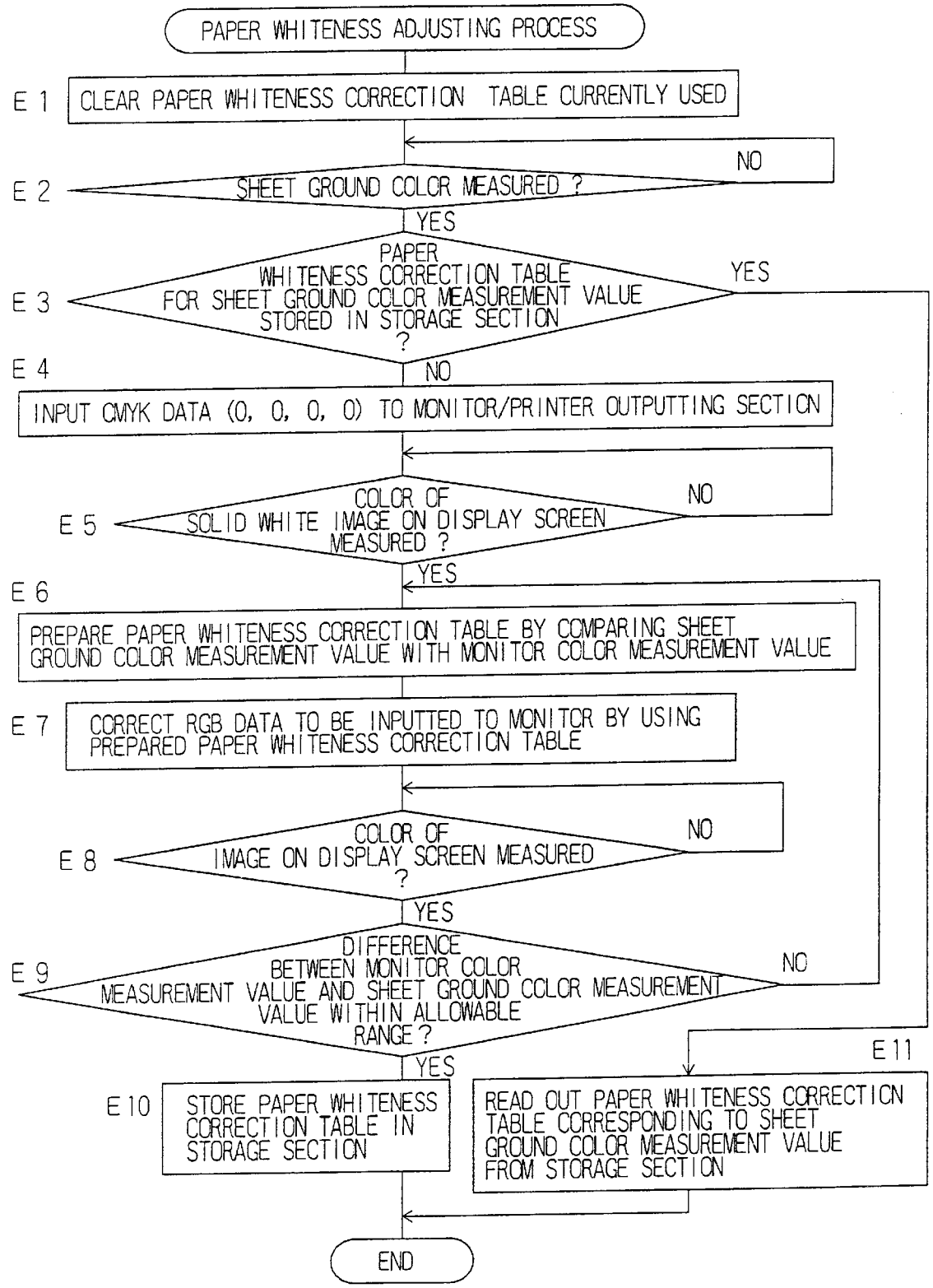
FIG. 4 is a flow chart illustrating a paper whiteness adjusting process according to the first embodiment.

FIG. 4 is a flow chart illustrating a paper whiteness adjusting process.

Where a print-out result, which is expected to be obtained when an image is recorded on a sheet different in paper quality (or ground color) from the sheet on which the color patches are outputted for preparation of the printer conversion tables $Tp_1$ and $Tp_2$, is to be displayed on the display screen 31 of the monitor 3, the operator operates the keyboard (not shown) to input a demand signal to the controller 5 for initiating the paper whiteness adjusting process. In response to the signal, the paper whiteness adjusting process is started.

Referring to FIGS. 1 and 4, when the paper whiteness adjusting process is started, the paper whiteness correction table previously used is abandoned (Step E1). Then, it is judged whether or not the operator has measured the ground color of the sheet to be newly used (Step E2). More specifically, it is judged whether or not sheet ground color measurement values are inputted to the paper whiteness correction table generating section 7 from the calorimeter 4. When the sheet ground color measurement values are inputted to the paper whiteness correction table generating section 7, the result of the judgment in Step E2 is positive.

If the result of the judgment in Step E2 is positive, it is judged whether or not a paper whiteness correction table for the sheet ground color measurement values inputted from the calorimeter 4 is stored in the storage section 8 (Step E3). If the storage section 8 stores therein the paper whiteness correction table for the sheet ground color measurement values which has been previously obtained by performing the paper whiteness adjusting process on a sheet having the same paper quality (or ground color) as this sheet, the result of the judgment in Step E3 is positive. Then, the paper whiteness correction table for the sheet ground color measurement values is read out of the storage section 8, and the process ends.

On the other hand, if the paper whiteness correction table for the sheet ground color measurement values inputted from the calorimeter 4 is not present, the result of the judgment in Step E3 is negative, so that white data (C, M, Y, K)=(0, 0, 0, 0), for example, are inputted to the monitor/printer outputting section 6 (Step E4). The white data, after being converted into XYZ data with the use of the printer conversion table $Tp_1$, are applied to the monitor conversion table Tm via the gradation conversion section 9 so as to be further converted into RGB data. Since the paper whiteness correction table previously used is abandoned in Step E1, the RGB data from the monitor conversion table Tm are inputted to the monitor 3 as they are. The monitor 3 displays a solid white image on the display screen 31 on the basis of the inputted RGB data.

The operator measures the color of the solid white image displayed on the display screen 31 by means of the calorimeter 4. On the basis of input of white color measurement values to the paper whiteness correction table generating section 7, the controller 5 determines that the solid white image displayed on the display screen 31 has been subjected to the color measurement (YES in Step E5).

If the result of the judgment in Step E5 is positive, a difference between the sheet ground color measurement values obtained in Step E2 and the measurement values for the solid white image displayed on the display screen 31 of the monitor 3 is determined in the paper whiteness correction table generating section 7. Then, a paper whiteness correction table for correcting RGB data outputted from the monitor conversion table Tm is prepared so that the difference between the measurement values thus obtained can be minimized (Step E6). The paper whiteness correction table is such that predetermined values are added to or subtracted from RGB data outputted from the monitor conversion table Tm.

In turn, the RGB data outputted from the monitor conversion table Tm are applied as an address to the paper whiteness correction table generated by the paper whiteness correction table generating section 7. Then, the RGB data outputted from the paper whiteness correction table are inputted to the monitor 3 (Step E7). Thus, the color of the solid white image displayed on the display screen 31 of the monitor 3 is modified into a color closer to the ground color of the sheet from pure white.

The operator measures the color of the color-modified image displayed on the display screen 31 by means of the calorimeter 4. The color measurement values obtained through the color measurement performed on the color-modified image by means of the colorimeter 4 by the operator are inputted to the paper white correction table generating section 7. On the basis of the input, the controller 5 determines that the color-modified image displayed on the display screen 31 has been subjected to the color measurement (YES in Step E8).

After the color measurement on the color-modified image, it is judged whether or not a difference between color measurement values for the color-modified image and the sheet ground color measurement values is within a predetermined allowable range (Step E9). More specifically, it is judged in Step E9 whether or not the color of the color-modified image displayed on the display screen 31 of the monitor 3 is substantially equated with the ground color of the sheet. If the color of the color-modified image displayed on the display screen 31 has large difference from the ground color of the sheet, the process returns to Step E6, and a new paper whiteness correction table is prepared on the basis of the color measurement values for the color-modified image and the sheet ground color measurement values.

Thereafter, the RGB data outputted from the monitor conversion table Tm are corrected on the basis of the newly prepared paper whiteness correction table (Step E7), whereby the color of the color-modified image displayed on the display screen 31 of the monitor 3 is further modified. When the color of the further color-modified image is measured by means of the calorimeter 4, the result of the judgment in Step E8 is positive. Then, the comparison of color measurement values in Step E9 is performed again.

The process sequence from Step E6 to Step E9 is repeated, and, when a difference between color measurement values for a color image displayed on the display screen 31 of the monitor 3 and the sheet ground color measurement values is within the aforesaid allowable range, the result of the Judgment in Step E9 is positive. If the result of the judgment in Step E9 is positive, the paper whiteness correction table prepared in the aforesaid manner is stored in the storage section 8 in correspondence with the sheet ground color measurement values obtained in Step E2 (Step E10).

Where a desired image is to be displayed on the display screen 31 of the monitor 3, the newly prepared paper whiteness correction table is used for correction of RGB data to be outputted from the monitor conversion table Tm. More specifically, CMYK data of the desired image are converted into XYZ data excluding the sheet ground color data with the use of the printer conversion table $Tp_1$. After the XYZ data are processed by the gradation conversion section 9, the resulting XYZ data are applied to the monitor conversion table Tm so as to be converted into RGB data. The RGB data (excluding the sheet ground color data) outputted from the monitor conversion table Tm are applied as an address to the prepared paper whiteness correction table, and corrected in consideration of the sheet ground color data. Thus, the image displayed on the display screen 31 of the monitor 3 has the same color tone as the image to be printed on the sheet by the printer 2.

In accordance with the embodiment described above, even if an image is to be recorded on a sheet different in ground color from the sheet on which the color patches Pa are outputted for the preparation of the printer conversion tables $Tp_1$ and $Tp_2$, a new paper whiteness correction table is prepared through the paper whiteness adjusting process shown in FIG. 4 which ensures proper correction of image data in accordance with the ground color of the new sheet, whereby RGB data to be inputted to the monitor 3 from the paper whiteness correction table are properly corrected in accordance with the ground color of the new sheet. As a result, an image having the same color tone as the image to be recorded on the new sheet can be displayed on the display screen 31 of the monitor 3. Therefore, there is no need to prepare additional printer conversion tables $Tp_1$, and $TP_2$ and monitor conversion table Tm to facilitate the color tone matching.

Paper whiteness correction tables $Th_1$ to $Th_n$ prepared for different types of sheets having different ground colors through the paper whiteness adjusting process are stored in the storage section 8 in correspondence with color measurement values for the respective sheet ground colors. Where a print-out result, which is expected to be obtained when an image is recorded on a sheet of the type which has been used in the paper whiteness adjusting process, is to be displayed on the monitor 3, the corresponding one of the paper whiteness correction tables stored in the storage section 8 is used. Therefore, there is no need to perform the process sequence from Step E3 to Step E10 for preparation of a new paper whiteness correction table, so that the burden on an operator can be further alleviated.

Figure 5:
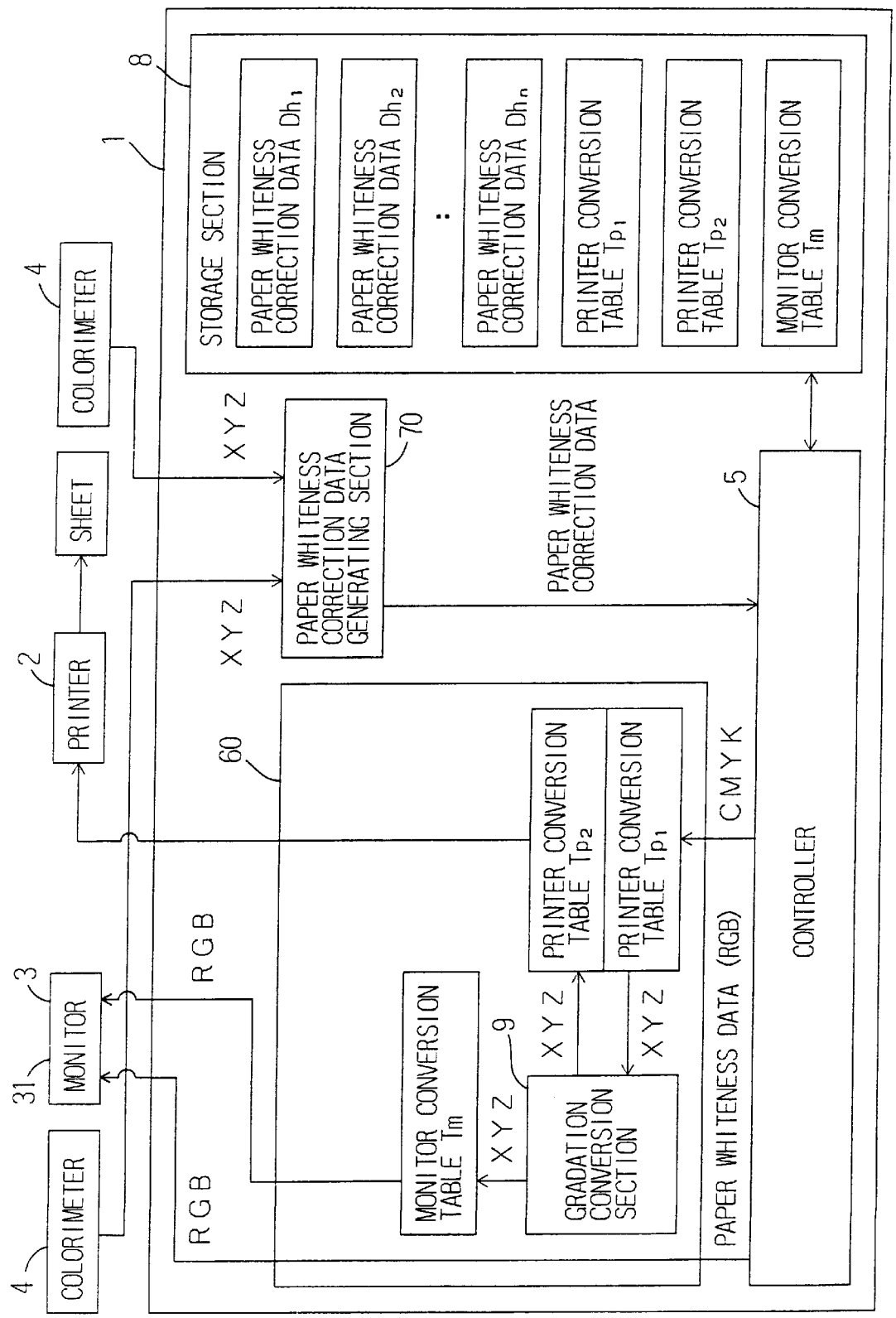
FIG. 5 is a block diagram illustrating the construction of a system to which a color image data outputting apparatus according to a second embodiment of the present invention is applied.

FIG. 5 is a block diagram illustrating the construction of a system to which a second embodiment of the present invention is applied. In FIG. 5, components having substantially the same functions as the components shown in FIG. 1 are denoted by the same reference numerals, and will not be explained in detail.

As in the first embodiment, CMYK data of an image inputted to a monitor/printer outputting section 60 are applied as an address to the printer conversion table $Tp_1$, so as to be converted into XYZ data excluding color data indicative of the ground color of a sheet. 31 of the monitor 3, the XYZ data read out of the printer conversion table $Tp_1$ are processed by the gradation conversion section 9, and applied as an address to the monitor conversion table Tm. Then, the XYZ data are converted into RGB data by addressing the monitor conversion table Tm, and the RGB data outputted from the monitor conversion table Tm are directly inputted to the monitor 3.

Paper whiteness data generated in a paper whiteness data generating section 70 or selected from paper whiteness data $Dh_1$ to $Dh_n$ stored in the storage section 8 are inputted to the monitor 3 by the controller 5. The paper whiteness data Dh are RGB analog data which produce a color image having the same color as the sheet ground color on the display screen 31 when inputted to the monitor 3. The paper whiteness data Dh are generated in a second paper whiteness adjusting process which will be described later. The monitor 3 displays the image on the display screen 31 on the basis of RGB data obtained by adding the paper whiteness data Dh to the RGB data inputted to the monitor 3 from the monitor conversion table Tm. Thus, the image displayed on the display screen 31 of the monitor 3 has the same color tone as the image to be outputted on the sheet by the printer 2.

In accordance with the second embodiment, the image having the same color tone as the image to be outputted on the sheet by the printer 2 can be displayed on the display screen 31 of the monitor 3 by adjusting the RGB analog data inputted to the monitor 3 from the controller 5.

Figure 6:
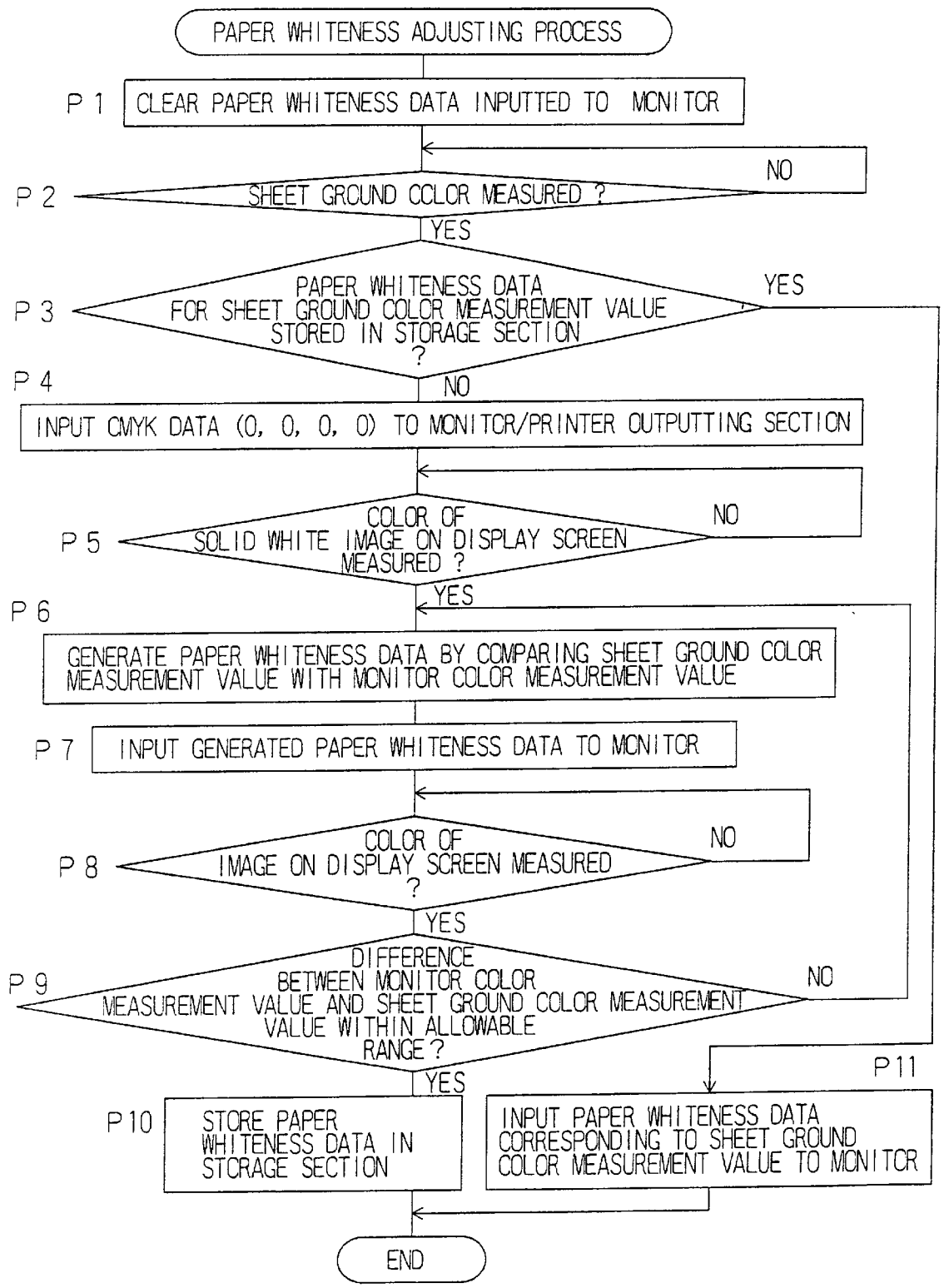
FIG. 6 is a flow chart illustrating a paper whiteness adjusting process according to the second embodiment.

FIG. 6 is a flow chart illustrating a paper whiteness adjusting process according to the second embodiment.

Referring to FIGS. 5 and 6, when the paper whiteness adjusting process is started, whiteness data inputted to the monitor 3 are cleared (Step P1). Then, it is judged whether or not the ground color of a sheet newly employed has been measured by the operator by means of the calorimeter 4 (Step P2). When measurement values obtained through the color measurement on the new sheet are inputted to the paper whiteness data generating section 70, the result of the judgment in Step P2 is positive.

If the result of the judgment in Step P2 is positive, it is judged whether or not paper whiteness data corresponding to the sheet ground color measurement values inputted from the calorimeter 4 are stored in the storage section 8 (Step P3). Where a sheet having the same paper quality (or ground color) as this sheet has been subjected to the paper whiteness adjusting process so that the paper whiteness data corresponding to the color measurement values for the sheet is stored in the storage section 8, the result of the judgment in Step P3 is positive. Then, the paper whiteness data corresponding to the sheet ground color measurement values are inputted to the monitor 3 (Step P11), and the process ends.

On the other hand, if the paper whiteness data corresponding to the sheet ground color measurement values inputted from the calorimeter 4 are not present, the result of the judgment in Step P3 is negative, and white data (C, M, Y, K)=(0, 0, 0, 0), for example, are inputted to the monitor/printer outputting section 60 (Step P4). The white data, after being converted into XYZ data with the use of the printer conversion table $Tp_1$, are applied to the monitor conversion table Tm via the gradation conversion section 9, so as to be converted into RGB data, which are in turn inputted to the monitor 3. The monitor 3 displays a solid white image on the display screen 31 on the basis of the inputted RGB data.

The operator measures the color of the solid white image thus displayed on the display screen 31 of the monitor 3 by means of the calorimeter 4. On the basis of input of white color measurement values to the paper whiteness data generating section 70, the controller 5 determines that the solid white image displayed on the display screen 31 has been subjected to the color measurement (YES in Step P5).

If the result of the judgment in Step P5 is positive, paper whiteness data (RGB data) which produce the same color as the sheet ground color on the display screen 31 are generated in the paper whiteness data generating section 70 on the basis of the sheet ground color measurement values obtained in Step P2 and the color measurement values of the solid white image displayed on the display screen 31 of the monitor 3 (Step P6). The controller 5 inputs the generated paper whiteness data to the monitor 3 (Step P7). Thus, the color of the solid white image displayed on the display screen 31 of the monitor 3 is modified into a color closer to the ground color of the sheet from pure white.

The operator measures the color of the color-modified image displayed on the display screen 31 by means of the calorimeter 4. The color measurement values obtained through the color measurement performed on the color-modified image by means of the calorimeter 4 by the operator are inputted to the paper white data generating section 70. On the basis of the input, the controller 5 determines that the color-modified image displayed on the display screen 31 has been subjected to the color measurement (YES in Step P8).

After the color measurement on the color-modified image, it is judged whether or not a difference between color measurement values of the color-modified image and the sheet ground color measurement values is within a predetermined allowable range (Step P9). More specifically, it is judged in Step P9 whether or not the color of the color-modified image displayed on the display screen 31 of the monitor 3 is substantially equated with the ground color of the sheet. If the color of the color-modified image displayed on the display screen 31 has a large difference from the ground color of the sheet, the process returns to Step P6, and new paper whiteness data are generated on the basis of the color measurement values for the color-modified image and the sheet ground color measurement values.

Thereafter, the newly generated paper whiteness data are inputted to the monitor 3 (Step P7), whereby the color of the color-modified image displayed on the display screen 31 of the monitor 3 is further modified. When the color of the further color-modified image is measured by means of the calorimeter 4, the result of the judgment in Step P8 is positive, and then the comparison of color measurement values in Step P9 is performed again.

The process sequence from Step P6 to Step P9 is repeated, and, when a difference between color measurement values for a color image displayed on the display screen 31 of the monitor 3 and the sheet ground color measurement values is within the aforesaid allowable range, the result of the judgment in Step P9 is positive. If the result of the judgment in Step P9 is positive, the paper whiteness data generated in the aforesaid manner are stored in the storage section 8 in correspondence with the sheet ground color measurement values obtained in Step P2 (Step P10). Where a desired image is to be displayed on the display screen 31 of the monitor 3, the generated paper whiteness data are applied to the monitor 3.

In accordance with the second embodiment, even if a print-out result, which is expected to be obtained when an image is recorded on a sheet different in paper quality (or ground color) from the sheet on which the color patches Pa are outputted for the preparation of the printer conversion tables $Tp_1$ and $TP_2$, is displayed on the display screen 31 of the monitor 3, the paper whiteness data to be inputted to the monitor 3 are changed by performing the paper whiteness adjusting process shown in FIG. 6. Thus, an image displayed on the display screen 31 of the monitor 3 is properly modified in accordance with the ground color of the newly employed sheet so as to have the same color tone as the image to be recorded on the sheet.

The paper whiteness data $Dh_1$ to $Dh_n$ generated for different sheet ground colors through the paper whiteness adjusting process are stored in the storage section 8 in correspondence with the color measurement values for the respective sheet ground colors. Where a print-out result expected to be obtained when an image is recorded on a sheet having the same ground color as a sheet previously used in the paper whiteness adjusting process is to be displayed on the display screen, the corresponding paper whiteness data are read out of the storage section 8 and applied to the monitor 3. At this time, there is no need to perform the process sequence from Step P3 to Step P10, so that the burden on an operator can be further alleviated.

In accordance with the second embodiment, where a print-out result expected to be obtained when a desired image is recorded on a sheet having a different paper quality (or ground color) is to be displayed on the display screen 31, RGB data converted from CMYK data of the image and inputted to the monitor 3 are not subjected to any processing, but only paper whiteness data to be inputted separately from the RGB data of the image to the monitor 3 are changed. More specifically, where a print-out result expected to be obtained when the desired image is recorded on one sheet is being displayed on the monitor, a print-out result expected to be obtained when the image is recorded on another sheet having a different paper quality can be displayed on the monitor simply by changing the paper whiteness data, while the RGB data of the desired image are being inputted to the monitor 3. Therefore, the time required for displaying an image on the display screen 31 of the monitor 3 after the type of the sheet is changed can be reduced in comparison with the first embodiment where RGB data of the image are corrected in accordance with the sheet ground color.

While the embodiments of the present invention have thus been described, the invention is not limited to these embodiments. In the embodiments described above, if the generated paper whiteness correction tables or paper whiteness data are stored in the storage section in correspondence with the sheet ground color measurement values and a print-out result expected to be obtained when an image is recorded on a sheet having the same ground color as any of previously used sheets is displayed, there is no need to prepare a new paper whiteness correction table or paper whiteness data. However, all the generated paper whiteness correction tables and paper whiteness data are not necessarily required to be stored in the storage section, but at least a newly generated paper whiteness correction table or paper whiteness data may be stored and, every time the type of the sheet is changed, the paper whiteness adjusting process is performed for generation of a paper whiteness correction table or paper whiteness data. In such a case, a storage medium having a smaller storage capacity can be employed as the storage section.

The paper whiteness correction tables employed in the first embodiment are designed such that predetermined values are added to or subtracted from RGB data outputted from the monitor conversion table. Alternatively, the paper whiteness correction tables may be designed such that different values are added to or subtracted from RGB data depending on the levels (0 to 255) of the RGB data for more precise color tone matching between an image displayed on the monitor and an image formed on a sheet.

Although the embodiments described above employ a printer as the image recording apparatus for recording an image, the image recording apparatus to be employed is not limited to the printer. For example, a printing apparatus of the type which is adapted to prepare a printing plate by irradiating a photosensitive film with beams generated in accordance with CMYK image data and record an image on a sheet with the use of the printing plate thus prepared.

While the present invention has been described in detail by way of embodiments thereof, it should be understood that the foregoing disclosure is merely illustrative of the technical principles of the present invention but not limitative of the same. The spirit and scope of the present invention are to be limited only by the appended claims.

This application claims priority benefits of Japanese Patent Application No. 9-86936 filed on Apr. 4, 1997 under 35 USC 119, the disclosure thereof being incorporated herein by reference.

What is claimed is:

1. A color image data outputting apparatus which is adapted to generate display image data for simulatively displaying on an image displaying apparatus a color image to be formed on a recording sheet by means of an image recording apparatus, the color image data outputting apparatus comprising:

a conversion table for converting color image data to be applied to the image recording apparatus into first color image data which correspond to those to be obtained by subtracting a measurement value of a ground color of a first recording sheet from a measurement value of a color of an image formed on the first recording sheet by applying said image data to the image recording apparatus;

a ground color correction circuit for correcting the first color image data outputted from the conversion table into second color image data which correspond to those to be obtained by adding a correction data indicative of the ground color of a second recording sheet to be used in the image recording apparatus to the first color image data, and causing the image displaying apparatus to display an image corresponding to the second color image data;

a ground color measuring device for measuring the ground color of the second recording sheet to be used in the image recording apparatus;

a display background color measuring device for measuring a background color of the image simulatively displayed on the image displaying apparatus, the background color corresponding to the ground color of the recording sheet; and a controller for determining a data correcting process to be performed by the ground color correction circuit so as to equate a color measurement result obtained by the ground color measuring device with a color measurement result obtained by the display background color measuring device.

2. A color image outputting apparatus as set forth in claim 1, wherein the ground color correction circuit includes a data conversion table for converting the first color image data into the second color image data, and inputs the second color image data to the image displaying apparatus.

3. A color image data outputting apparatus as set forth in claim 1, wherein the ground color correction circuit includes means for inputting the first color image data to the image displaying apparatus, and a display controlling circuit for controlling a display operation of the image displaying apparatus to display the image corresponding to the second color image data on the image displaying apparatus.

4. A color image outputting apparatus as set forth in claim 1, wherein the controller includes a storage medium for storing therein correction process data indicative of the data correcting process employed when the color measurement result obtained by the ground color measuring device is equated with the color measurement result obtained by the display background color measuring device.

5. A color image outputting apparatus as set forth in claim 4, wherein the storage medium is capable of storing therein a plurality of correction process data corresponding to plural types of recording sheets, and wherein the controller further includes selection means for selecting one of the plurality of correction process data, and determines the data correcting process to be performed by the ground color correction circuit on the basis of the selected correction process data.

6. A method of generating display image data for simulatively displaying on an image displaying apparatus a color image to be formed on a recording sheet by means of an image recording apparatus, the method comprising:

a color image data conversion step of converting, with a use of a conversion table, color image data to be applied to the image recording apparatus into first color image data which correspond to those to be obtained by subtracting a measurement value of a ground color of a first recording sheet from a measurement value of a color of an image formed on the first recording sheet by applying said image data to the image recording apparatus;

a ground color correction step of causing the image displaying apparatus to display an image corresponding to second color image data which correspond to those to be obtained by adding a correction data indicative of the ground color of a second recording sheet to be used in the image recording apparatus to the first color image data outputted from the conversion table;

a ground color measurement step of measuring the ground color of the second recording sheet to be used in the image recording apparatus;

a display background color measurement step of measuring a background color of the image simulatively displayed on the image displaying apparatus, the background color corresponding to the ground color of the recording sheet; and a control step of determining a data correcting process to be performed in the ground color correction step so as to equate a color measurement result obtained in the ground color measuring step with a color measurement result obtained in the display background color measurement step.

7. A method as set forth in claim 6, wherein the ground color correction step includes the steps of:

converting the first color image data into the second color image data with a use of a data conversion table; and inputting the second color image data to the image displaying apparatus.

8. A method as set forth in claim 6, wherein the ground color correction step includes the steps of:

inputting the first color image data to the image displaying apparatus; and controlling a display operation of the image displaying apparatus to display the image corresponding to the second color image data on the image displaying apparatus.

9. A method as set forth in claim 6, further comprising the step of storing, in a storage medium, correction process data indicative of the data correcting process employed when the color measurement result obtained in the ground color measurement step is equated with the color measurement result obtained in the display background color measurement step.

10. A method as set forth in claim 9, wherein the storage medium is capable of storing therein a plurality of correction process data corresponding to plural types of recording sheets, and wherein the control step includes the steps of:

selecting one of the plurality of correction process data stored in the storage medium, and determining the data correcting process to be performed in the ground color correction step on the basis of the selected correction process data.

11. A method as set forth in claim 6, further comprising the steps of:

applying test image data to the image recording apparatus thereby to form a test image on the first recording sheet;

measuring a color of the test image;

measuring a ground color of the first recording sheet;

subtracting a color measurement value indicative of the ground color of the first recording sheet from a color measurement value indicative of the color of the test image; and preparing the conversion table by determining a correspondence between a value obtained in the subtraction step and the test image data.

12. A method of generating display image data for simulatively displaying on an image displaying apparatus a color image to be formed on a recording sheet by means of an image recording apparatus, the method comprising the steps of:

converting color image data to be applied to the image recording apparatus into first color image data which correspond to those to be obtained by subtracting a measurement value of a ground color of a first recording sheet from a measurement value of a color of an image formed on the first recording sheet by applying said image data to the image recording apparatus; and generating the display image data by adding the first color image data and correction data which correspond to those indicative of the ground color of a second recording sheet to be used in the image recording apparatus.

13. A method as set forth in claim 12, further comprising the steps of:

measuring the ground color of the second recording sheet;

measuring a background color of the image simulatively displayed on the image displaying apparatus, the background color corresponding to the ground color of the recording sheet; and generating the correction data on the basis of a measurement result on the ground color of the second recording sheet and a measurement result on the background color of the image displayed on the image displaying apparatus.

14. A method of simulatively displaying on an image displaying apparatus a color image to be formed on a recording sheet by means of an image recording apparatus, the method comprising the steps of:

converting color image data to be applied to the image recording apparatus into first color image data which correspond to those to be obtained by subtracting a measurement value of a ground color of a first sheet from a measurement value of a color of an image formed on the first recording sheet by applying said image data to the image recording apparatus, and inputting the first color image data to the image displaying apparatus; and controlling an operation of the image displaying apparatus through a control process such that the ground color of the second recording sheet is added on the displayed color image.

15. A method as set forth in claim 14, further comprising the steps of:

measuring the ground color of the second recording sheet;

measuring a background color of the image simulatively displayed on the image displaying apparatus, the background color corresponding to the ground color of the recording sheet; and determining the control process for controlling the operation of the image displaying apparatus on the basis of a measurement result on the ground color of the second recording sheet and a measurement result on the background color of the image displayed on the image displaying apparatus.

* * * * *